(12) United States Patent
Saito et al.

(10) Patent No.: US 9,071,643 B2
(45) Date of Patent: Jun. 30, 2015

(54) PERSONAL SECURITY SYSTEM

(75) Inventors: Ghen Saito, New York, NY (US);
Rodger Desai, Piscataway, NJ (US);
Raju Rishi, Manalapan, NJ (US)

(73) Assignee: RAVE WIRELESS, INC., Framingham, MA (US)

( * ) Notice: Subject to any disclaimer, the term of this patent is extended or adjusted under 35 U.S.C. 154(b) by 0 days.

(21) Appl. No.: 13/440,319

(22) Filed: Apr. 5, 2012

(65) Prior Publication Data

US 2012/0252399 A1 Oct. 4, 2012

Related U.S. Application Data

(63) Continuation of application No. 11/687,818, filed on Mar. 19, 2007, now abandoned.

(60) Provisional application No. 60/784,276, filed on Mar. 20, 2006.

(51) Int. Cl.
| | |
|---|---|
| H04L 29/06 | (2006.01) |
| H04W 12/02 | (2009.01) |
| H04W 4/02 | (2009.01) |
| H04W 8/10 | (2009.01) |

(52) U.S. Cl.
CPC .............. *H04L 63/20* (2013.01); *H04L 63/107* (2013.01); *H04W 4/02* (2013.01); *H04W 8/10* (2013.01); *H04W 12/02* (2013.01)

(58) Field of Classification Search
USPC ................. 455/404.1, 404.2, 410, 411, 422.1; 340/539.12; 379/37, 38, 45
See application file for complete search history.

(56) References Cited

U.S. PATENT DOCUMENTS

| | | | |
|---|---|---|---|
| 4,643,462 A | 2/1987 | Wallace | |
| 5,710,803 A | 1/1998 | Kowal et al. | |
| 5,787,429 A | 7/1998 | Nikolin | |
| 5,805,670 A | 9/1998 | Pons et al. | |
| 5,808,564 A | 9/1998 | Simms et al. | |
| 6,353,398 B1 | 3/2002 | Amin et al. | |
| 6,480,725 B2 | 11/2002 | Cassidy et al. | |
| 6,560,456 B1 | 5/2003 | Lohtia et al. | |
| 6,600,812 B1 | 7/2003 | Gentillin et al. | |
| 6,643,355 B1 | 11/2003 | Tsumpes | |
| 6,661,340 B1 | 12/2003 | Saylor et al. | |
| 6,696,956 B1 * | 2/2004 | Uchida et al. | ............... 340/573.1 |
| 6,973,166 B1 | 12/2005 | Tsumpes | |
| 7,026,928 B1 * | 4/2006 | Lane | .......................... 340/539.13 |
| 7,038,590 B2 | 5/2006 | Hoffman et al. | |
| 7,046,140 B2 | 5/2006 | Adamczyk et al. | |
| 7,068,189 B2 | 6/2006 | Brescia | |
| 7,130,389 B1 | 10/2006 | Rodkey et al. | |

(Continued)

OTHER PUBLICATIONS

*International Search Report* (PCT/US07/64273) Mailed 10/10/07; 2 pages.

*Primary Examiner* — George Eng
*Assistant Examiner* — Joseph Dean, Jr.
(74) *Attorney, Agent, or Firm* — Occhiuti & Rohlicek LLP

(57) ABSTRACT

A personal security system takes advantage of location determination capabilities of a mobile communication services to provide personal security features to one or more communities of users. One method includes a user initiating a security period from a mobile device and specifying an end condition for that security period. If the user does not terminate the security period, at the end of the security period a notification is sent with information characterizing the user and a location associated with the user.

31 Claims, 2 Drawing Sheets

(56) References Cited

U.S. PATENT DOCUMENTS

| | | |
|---|---|---|
| 7,149,533 B2 | 12/2006 | Laird et al. |
| 7,174,005 B1 | 2/2007 | Rodkey et al. |
| 7,212,111 B2 | 5/2007 | Tupler et al. |
| 7,312,712 B1 | 12/2007 | Worrall |
| 7,362,852 B1 | 4/2008 | Rodkey et al. |
| 7,770,229 B2 | 8/2010 | Upendran |
| 2001/0026221 A1 | 10/2001 | Toyota |
| 2002/0102996 A1 | 8/2002 | Jenkins |
| 2002/0107927 A1 | 8/2002 | Gallant |
| 2002/0142813 A1 | 10/2002 | Cassidy et al. |
| 2003/0041107 A1* | 2/2003 | Blattner et al. ............... 709/204 |
| 2004/0190720 A1 | 9/2004 | Harvey |
| 2004/0198315 A1 | 10/2004 | Vellotti |
| 2004/0225681 A1* | 11/2004 | Chaney et al. ............. 707/104.1 |
| 2005/0003797 A1* | 1/2005 | Baldwin .................... 455/404.1 |
| 2005/0009536 A1* | 1/2005 | Ito et al. ..................... 455/456.1 |
| 2005/0085257 A1* | 4/2005 | Laird et al. ................. 455/550.1 |
| 2005/0170810 A1 | 8/2005 | Choi et al. |
| 2006/0263022 A1 | 11/2006 | Han |
| 2007/0072583 A1 | 3/2007 | Barbeau |
| 2007/0072586 A1* | 3/2007 | Morhenn et al. .............. 455/406 |
| 2007/0093234 A1 | 4/2007 | Willis et al. |
| 2007/0149214 A1 | 6/2007 | Walsh et al. |
| 2007/0190512 A1 | 8/2007 | Meimer et al. |
| 2007/0288758 A1 | 12/2007 | Weiss |
| 2008/0188198 A1 | 8/2008 | Patel et al. |

* cited by examiner

PERSONAL SECURITY SYSTEM

CROSS REFERENCE TO RELATED APPLICATIONS

This application is a continuation of U.S. Utility application Ser. No. 11/687,818, filed Mar. 19, 2007, which claims the benefit of the priority date of U.S. Provisional Application No. 60/784,276, filed Mar. 20, 2006. The contents of the aforementioned applications are referenced herein.

BACKGROUND

This invention relates to a system for personal security.

Cellular telephone systems today typically provide some sort of location tracking of users, for example, to determine the location of a user that dials an emergency number (e.g., using E911). In some communities of users, such as students on a university campus, use of cellular telephones has become ubiquitous, with users using text messaging and other applications to stay "connected."

SUMMARY

In one aspect, in general, a personal security system takes advantage of location determination capabilities of a mobile communication services to provide personal security features to one or more communities of users.

In another aspect, in general, a method includes a user initiating a security period from a mobile device and specifying an end condition for that security period. If the user does not terminate the security period, at the end of the security period a notification is sent with information characterizing the user and a location associated with the user.

In another aspect, in general, a method includes receiving communication indicative of initiation of a security period associated with a user of a mobile device. If the user does not terminate the security period, at the end of the security period sending a notification with information characterizing the user and a location associated with the user.

In another aspect, in general, a system includes a communication server that includes a communication link to a location based server for obtaining location information associated with mobile devices for users in a community. The communication server is configured to receive communication indicative of initiation by a user of the mobile devices of a security period, and if the user does not terminate the security period, at the end of the security period send a notification with information characterizing the user and a location associated with the user.

Aspects can include one or more of the following features.

Receiving the communication includes receiving a specification of an end condition for the security period. The end condition may include an end time for the security period. The method may include timing the security period to determine the end of the security period.

The user is prompted at the end of the security period to terminate the security period.

Sending the notification includes sending the notification to a security service associated with the user.

Information characterizing a location associated with the user is obtained from a mobile communication system servicing the mobile device. For example, the mobile device is a cellular telephone and the mobile communication system is a cellular telephone system.

The user was previously enrolled, for example, by receiving personal information associated with the user.

Sending the notification includes sending personal information associated with the user.

The security period can have a user-specified duration, and the end condition for the period corresponds to expiration of a timer for the period.

The user initiates the security period using a mobile device, and optionally terminates the security period using the mobile device. The mobile device can be a mobile telephone.

The location associated with the user can include a GPS-based location, for example, determined by a communication system to which the mobile device is coupled In another aspect, in general, mobile devices are provided to users in a set of communities of users. Communication is monitored at a server from the users indicative of initiation and termination of security periods associated with the users. Based on the monitored communication, notifications are sent with information characterizing users and locations associated with said users. The recipients of the notifications are determined based on the corresponding communities to which the users belong. The notifications may be indicative of possible security conditions associated with the users. Sending of the notifications may be based on expiration of security periods prior to receipt of corresponding communication indicative of termination of the security periods.

Aspects can have advantages that include one or more of the following:

Faster and more effective intervention is possible. Campus safety can be immediately notified on an incident, the location and critical information such as the student's description and any medical issues. Students are also provided with a one button "panic call" option prompting an immediate response.

The system can eliminate "consensual" arguments in acquaintance assault because activation of the system is a clear sign that the student was uncomfortable in a situation.

Crimes in progress may be interrupted when the system timer expires campus safety immediately calls the student's phone, interrupting any assault Clery Act Timely Warnings are made possible so that universities are able to instantly broadcast warnings via TXT messages.

Areas of concern on campus may be highlighted. Historical reporting on areas where the system was initiated provides universities with a clear picture of areas where students feel uncomfortable and at what times of day, enabling proactive measures such as increased patrols or enhanced lighting.

Other features and advantages of the invention are apparent from the following description, and from the claims.

DESCRIPTION

Figure 1:
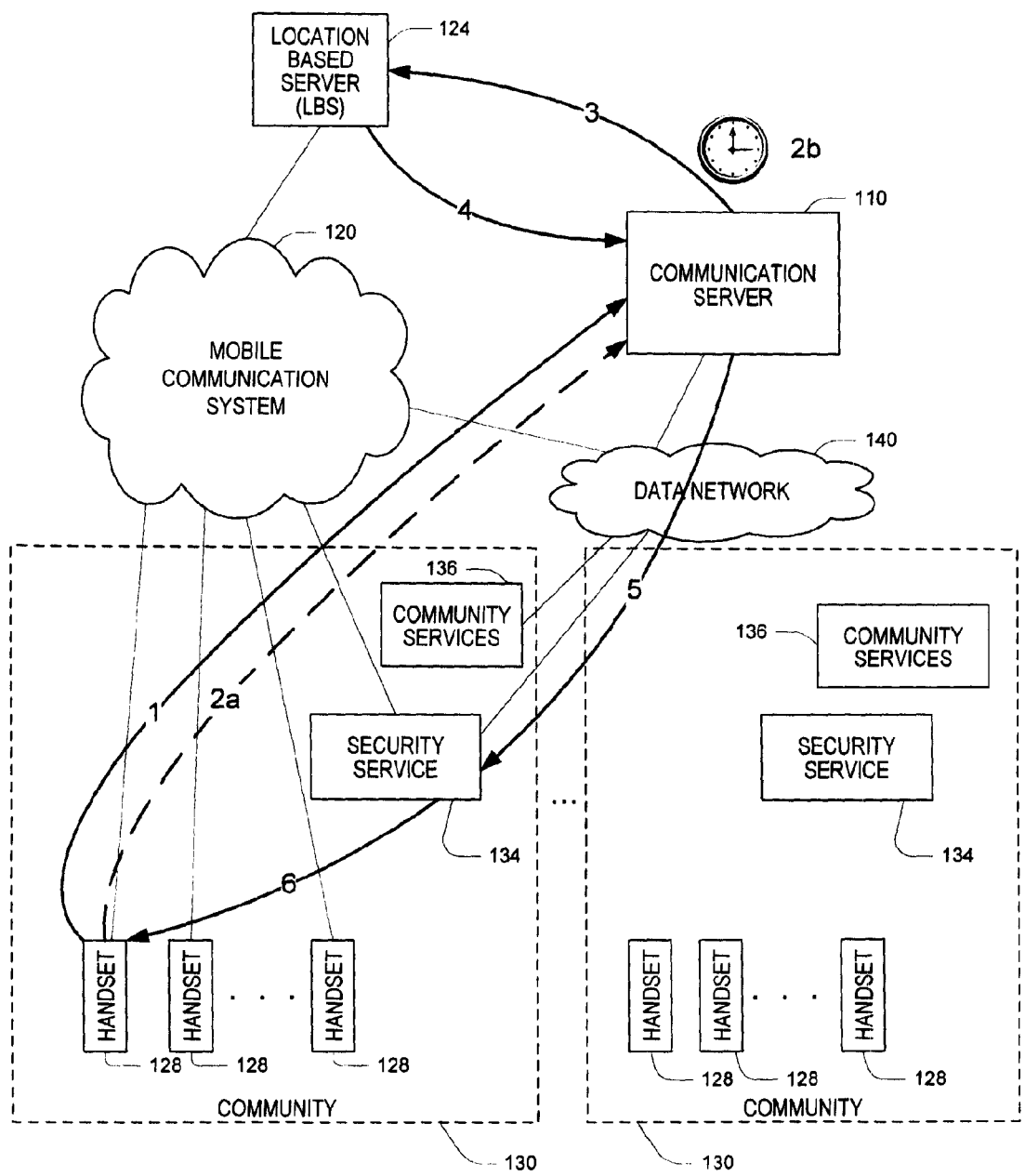
FIG. 1 is a block diagram of a personal security system

Referring to FIG. 1, a personal security system makes use of personal mobile handsets 128 coupled to a mobile communication system 120. Each handset 128 is associated with a corresponding user of the system. In some examples, the handsets are cellular telephones that are coupled by a mobile telephone system, such as a GSM, CDMA or and iDen based system.

Very generally, the system makes use of a communication server 110, one function of which is to determine when a security situation may exist for one of the users, and to then alert an appropriate security service 134. The security service then determines if there is truly a security situation, for example, by communicating with the user over the handset or investigating in person.

In order to aid the security service, examples of the system make use of various types of location based services. For example, the mobile communication system includes or has associated with it a location based server (LBS) 124, which is able to determine the location of a particular handset 128. The communication server 110 can query the LBS 124 (e.g., as a software based request over the Internet) to determine the location of a particular handset. Different examples of the security system make use of one or more types of location determination approaches. One type of location determination approach uses Global Positioning System (GPS) functionality that is built into the handset, optionally assisted by fixed elements of the mobile communication system 120 in an Assisted GPS (AGPS) approach. Other location determination approaches use signal strength and/or direction information in triangulation approaches based on transmitted or received radio signals from the mobile communication system. Yet other approaches are based on cell identification in a cellular telephone network.

Some examples of the system provide services to multiple different communities 130 of users. Communities can be various associations of users, which may each be served by their own security service 134. An example of a community is a university, with the security service being the campus police service for that university. In such an example, different universities typically have separate campus police services.

Note that in some examples, the communities may not be geographically separated. For example, urban universities may have student communities that are very close to one another (e.g., students of New York University and Columbia University), and the users is such communities may operate in overlapping geographic regions. The system supports configurations in which the users are serviced by the security service for their community, regardless of their actual geographic location.

In some examples, the personal security system supports a personal security button on the handset. Various approaches to configuring the handset to provide such a button are possible, including through provisioning by the operator of the mobile communication system and by downloading software to a configurable device. For example, the "home" or "dashboard" screen of a mobile telephone can provide direct "one touch" access to security services.

When a user activates the personal security button, the handset 128 sends a message to the communication server 110. Various approaches to sending the message are used in different examples of the system. Some examples use a Short Message Service (SMS) provided through the mobile communication system. When the communication server 110 receives the message, it queries the LBS 124 to determine the location of the sending handset. In some examples the LBS already has access to location information for the handset that is maintained by the communication system, while in other examples, it in turn queries the communication system which determines the handset's location. The LBS returns the handset's location to the communication server 110, which then contacts the appropriate security service 134 for the user's community.

Different examples of the system use various approaches to enrollment of users. In some approaches, a web-based approach is used in which a user provides enrollment information to the communication server. Such information includes an identification of the user's community 130, and optionally personal information that might be useful to the security service in an emergency. In other examples, the users enroll through a system operated by the community, and personal information is maintained privately within the community. The community provides the communication server with identifications of the handsets within its community. Example of personal information that may be useful to a security service is a photograph of the user and physical data (e.g., gender, height, weight, hair color, etc.)

Some mobile communication systems 120 require that a user authorize particular parties so that they can access their location information, for example, through the LBS 124. In such systems, as part of the enrollment process the users provide the necessary authorization, which is communicated to the LBS and/or the mobile communication system.

In some examples, the personal security system supports a mode that can be used when a user expects to be at some risk for an upcoming interval of time. For example, a university student may need to cross a campus late at night and feel at risk walking along isolated paths.

Some examples of such a mode use a timer-based approach. Generally, when the user is about to initiate an interval of time during which they may feel at risk, they initiate the timing of an interval by the security system. If the user "checks in" before the expiry of the interval, or alternatively in response to a prompt by the system at the end of the interval, the user is deemed to be safe. On the other hand, if the user does not check in or does not respond to a prompt, or optionally if the handset is not accessible from the communication system 120 during the interval, the security service for that user's community is notified along with the last known location of the handset.

Referring to FIG. 1, a sequence of steps for a previously registered user of the system are described in such an example:

Step 1: The user notifies the communication server 110 that they are about to start an at-risk interval. In different examples, this step is carried out in a variety of ways. For example, the handset may have a browser (e.g., a Wireless Application Protocol, WAP, browser) that accesses an application at the communication server that provides a graphical interface for display on the handset. The graphical interface permits the user to enter the duration of the interval (or alternatively the end time of the interval). In some examples, the user has provided a Personal Identification Number (PIN) to be used to check in—in other examples the user provides a check-in PIN at the start of the interval. In some examples, a software application has already been loaded on the handset, and the application sends data messages to the communication server 110 to initiate the interval. In other examples, communication techniques such as SMS, or voice based (e.g., using speech recognition) or touch-tone (DTMF) based interfaces are user by the user to inform the communication server that the interval is about to start. In some examples, the communication between the handset and the communication server is direct, while in other examples, the communication is mediated by a system operated by the user's community. When the communication server determines that the user has started an interval, it begins a count-down timer that will expire at the end of the interval.

Step 2*a*: Prior to the end of the interval, the user can communicate with the communication server to check in and terminate the interval. With PIN-based approaches, the user enters their secret PIN, which was recorded as part of a registration procedure, or was provided at the start of the interval. In some examples, the user has the option of entering a special PIN that indicates that they are in danger. For example, suppose an attacker forces a user to terminate the interval, the user can enter a special PIN, such a pre-arranged PIN or the normal PIN with a special suffix (e.g., adding a 1 at the end of the PIN). This can signal the communication server that the user is in danger without alerting the attacker.

Step 2b: If at the end of the interval the user has not yet check in, the communication server can act on the possibility that the user is in danger. In some examples, the server first communicates automatically with the user. For example, the server may interact with an application executing on the handset, send a SMS-based message that needs to be responded to, or may a telephone call requiring voice or text entry of the PIN.

Step 3: If the user has not checked in prior to the expiry of the planned interval, or has not responded to the prompt from the system at the end of the interval in examples that are configured to provide such a prompt, the communication server 110 requests location information for the user's handset.

Step 4: The LBS 124 determines the last known location of the user, optionally with the time the location determination was made. The LBS then send this location information to the communication server 110. The location information may take various forms, such as latitude and longitude.

Step 5: The communication server 110 notifies the security service 134 for the user. In examples in which the communication server 110 serves many communities, the server has been configured with at least information identifying the particular security service to notify (or alternatively, multiple security services may be notified and only the one responsible for that handset acts on the notification). In examples in which the communication server has additional personal information related to the user (e.g., name, photo, etc.) it sends this information along with the notification. In examples in which the security service has access to personal information for that user, it accesses that information in response to the notification.

Figure 2:
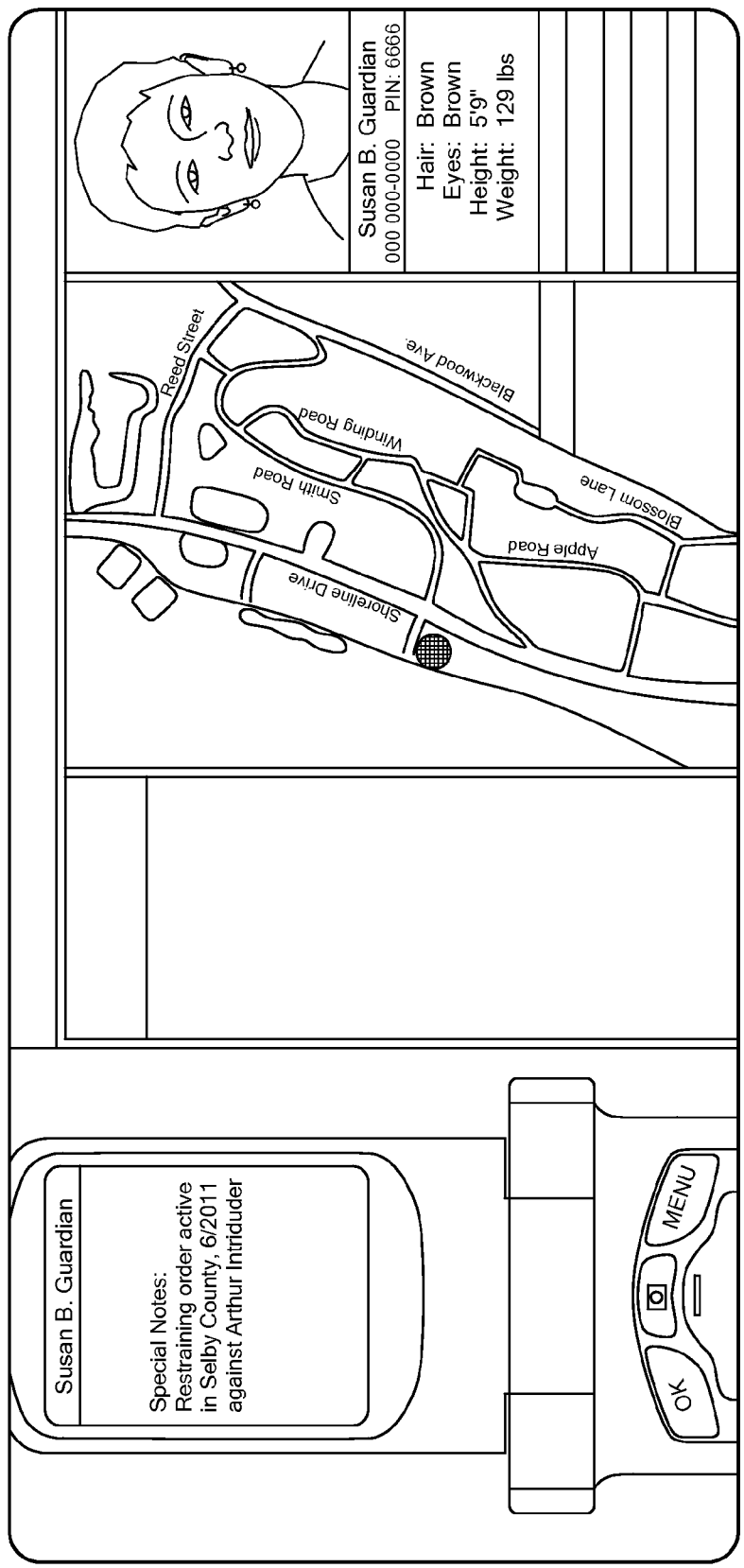
FIG. 2 is a graphical display for security personnel.

In some examples, security personnel, for example at a command station or at a mobile device for personnel on patrol, are provided with a display associated with the user and the current risk. For example, referring to FIG. 2, a graphical display with a map showing the user's location (or last known location), a photograph of the user, as well as text-based personal information are displayed to the security personnel.

Step 6: The security personnel attempt to interact with the user, for example, by calling their handset to establish person-to-person communication, and/or by dispatching personnel to the user's location to provide assistance. When appropriate, the security service may notify other security organizations, such as a local police department, to help handle the incident.

In some examples, when a user initiates an at-risk interval, the communication server may initially inform the security service and provide location information obtained from the LBS on an ongoing basis. The security service can maintain a display, for example showing their locations on a map, of users as they travel. In some examples, users may have the option of permitting or denying such tracking, for example, for privacy reasons. A concentration of users in a particular area may be addressed by dispatching preventive patrols into the area. Also, historical information may be logged, for example, to identify areas and time in which users feel at risk or in which incidents actually occur. Such historical information may used, for example, to improve users' sense of security in those areas, for example though physical improvements (e.g., lighting) or increased patrols.

In some examples, the security period may be defined using other and/or additional criteria than time duration or end time. For example, a user may identify a route (e.g., using a destination building number) and the security period is defined as the time until the user reaches the destination. In such an example, the end of the security period may be defined by the server as a reasonable time needed to reach the destination. In some examples, the communication server may determine that there may be a possible security condition if the user deviates significantly from a path to the declared destination.

In some examples, security periods may be initiated or defined by entities other than the user. For example, a parent may require that a child check in at a particular time (e.g., at midnight) or at a set of prespecified times (e.g., every two hours). In addition or instead of notifying a security service, the parent may be notified if the child fails to check in. That is, the parent may serve the role of the security service. Similarly, an elderly parent may need to check in periodically or else their adult child or other caregiver is notified with information about their location. In some examples, a child may initiate the security period with the parent being notified if they fail to terminate the period or check in when prompted.

In some examples, a security period may be initiated by a passive activity of the user. For example, a system may detect that a user has entered a predefined geographic area (e.g., going off campus, leaving a nursing home) and may have to check in within a certain period of time (e.g., within one hour).

In some examples, the user's community security service is notified regardless of the user's geographic location. For example, a user from a university in California may be visiting New York City yet their security-related notifications are sent back to California. This approach can permit their university security service to provide additional information to local New York police. In other examples, the security service that is notified may depend on the user's geographic location. For example, universities may cooperate and a student visiting another university's campus may result in a notification to the security service of the visited university in addition or instead of the user's home university.

In some examples, one communication server 110 may interact with multiple mobile communication systems. For example, users in a single community 130 or in different communities 130 may be served by different mobile telephone carriers.

In some version of the system, additional community services 136 may take advantage of the capabilities of the communication server. For example in a university situation, a community service may include an academic group that provides class-related notifications (e.g., class cancellation, in-class surveys, etc.). Another community service may include access to transportation information, such a campus bus routes, schedules, and expected arrival time information. Other examples include broadcasting of campus-wide alerts, which may be security related.

In the description above, in some examples of the system a university student community is provided as an example of users served by the system. Other examples of communities may be served by examples of the system. For example, personnel on a military base, a special interest group, a church group, residents of a housing development, inhabitants of cities, towns, hotel guests, etc. can each form a community served by an example of a personal security system.

In some examples, capabilities described are implemented in software, which may be stored on computer readable media or embodied on signals propagating through communication media (e.g., over wired or wireless networks). The software may include instructions, such as machine instructions, programming language or interpreter statements, instructions for virtual machines (e.g., Java), or other forms of instructions. The software may be distributed, for example, with some components execution on the handsets and other components executing at fixed servers.

It is to be understood that the foregoing description is intended to illustrate and not to limit the scope of the invention, which is defined by the scope of the appended claims. Other embodiments are within the scope of the following claims.

What is claimed is:

1. A method for providing assistance to each of a plurality of users, each of said users having been enrolled as a member of a community, said method comprising: receiving, at a server, a first communication from a first mobile device associated with a first distressed user from said plurality of users, said distressed user having been enrolled as a member of a first community, said first mobile device being at a first location, said first location being associated with a first designated party for receiving emergency calls originating from said first location, receiving, at a server, a second communication from a second mobile device associated with a second distressed user from said plurality of users, said distressed user having been enrolled as a member of said first community, said second mobile device being at a second location, said second location being associated with a second designated party for receiving emergency calls originating from said second location, said second designated party being different from said first designated party, in response to said first communication, causing said server to initiate communication with a third designated party wherein said third designated party is different from both said first and second designated parties, wherein said third designated party is designated to receive emergency communications from members of said first community, in response to said second communication, causing said server to initiate communication with said third designated party, displaying, to said third designated party, information characterizing said first distressed user, displaying, to said third designated party, information characterizing said second distressed user, in response to said first communication, sending a communication from said third designated party to said first mobile device and in response to said second communication, sending a communication from said third designated party to said second mobile device.

2. The method of claim 1, wherein receiving said first communication comprises receiving a communication initiated by actuating a dedicated panic button on said first mobile device, wherein said dedicated panic button is a button that has no other function, whether alone or in combination with other buttons, but to initiate a communication to said third designated party, and wherein, upon actuating said panic button, said first mobile device initiates said first communication to said third designated party.

3. The method of claim 1, wherein said information characterizing said first distressed user comprises medical information associated with said first distressed user.

4. The method of claim 1, wherein said information characterizing said first distressed user comprises vital information associated with said first distressed user.

5. The method of claim 1, wherein displaying, to said third designated party, information characterizing said first distressed user occurs upon occurrence of an event.

6. The method of claim 5, wherein said event comprises a lapse of a user-defined security period.

7. The method of claim 6, further comprising receiving, from said first distressed user, a length of said user-defined security period.

8. The method of claim 7, further comprising providing a graphical user interface on said first mobile device for receiving said length.

9. The method of claim 8, further comprising providing a graphical user interface on said first mobile device to enable said first distressed user to prematurely terminate said security period.

10. The method of claim 9, further comprising providing a graphical user interface on said first mobile device for soliciting information required to prematurely terminate said security period.

11. The method of claim 1, wherein said first community is a college having a campus.

12. The method of claim 1, wherein said first community is a college having a campus, and wherein said first location is outside said campus.

13. The method of claim 12, further comprising transmitting said information characterizing said first distressed user to a police department associated with said first location.

14. The method of claim 1, wherein said third designated party comprises a member of a campus police department.

15. The method of claim 1, further comprising sharing, with a plurality of members of said first community, information indicative of a location of said first mobile device.

16. A manufacture comprising a tangible and non-transitory computer-readable medium having encoded thereon software for causing a processing system to execute said method recited in claim 1.

17. The method of claim 16, wherein said personal security button is configured to provide direct one-touch access to said third designated party.

18. The method of claim 1, further comprising, at said server, determining that said first distressed user has been enrolled in said first community.

19. The method of claim 18, further comprising, at said server, receiving a third communication from a third mobile device associated with a third distressed user, determining that said third distressed user has been enrolled as a member of a second community that differs from said first community, and initiating communication with a fourth designated party, wherein said fourth designated party is different from said first, second, and third designated parties, wherein said fourth designated party is designated to receive emergency calls from members of said second community.

20. The method of claim 18, wherein said designated party associated with said first community is a member of a first campus police department and said designated party associated with said second community is a member of a second campus police department.

21. The method of claim 1, wherein displaying information characterizing said first distressed user comprises displaying information representative of a location associated with said first mobile device.

22. The method of claim 1, wherein said third designated party is independent of geographic location of said user.

23. The method of claim 1, further comprising, prior to receiving said first communication, receiving information indicative of enrollment of said first and second users.

24. The method of claim 1, wherein causing said server to initiate communication with said third designated party associated with said first community comprises determining that said user has been enrolled as a member of said first community, and identifying a designated party associated with said first community from among a plurality of designated parties, each of which is associated with one of a plurality of corresponding communities.

25. The method of claim 1, wherein said third designated party is a member of a security service that provides assistance to all members of said community.

26. The method of claim 1, wherein receiving said first communication comprises receiving a communication initiated by actuating a personal security button on said first mobile device.

27. The method of claim 26, wherein said first mobile device is a configurable device, and wherein personal security button is provided by downloadable software that has been downloaded to said configurable device.

28. The method of claim 26, wherein said personal security button is on a home screen of said first mobile device.

29. An apparatus for providing assistance to each of a plurality of users, each of said users having been enrolled as a member of a community, said apparatus comprising: a communication server configured to: receive a first communication from a first mobile device, said first mobile device belonging to a first distressed user from said plurality of users, said first distressed user having been enrolled in a first community, said first mobile device being at a first location, said first location being associated with a first designated party for receiving emergency calls originating from said first location, to receive a second communication from a second mobile device associated with a second distressed user from said plurality of users, said distressed user having been enrolled as a member of said first community, said second mobile device being at a second location, said second location being associated with a second designated party for receiving emergency calls originating from said second location, said second designated party being different from said first designated party, to respond to said first communication by initiating communication with a third designated party, wherein said third designated party is different from both said first and second designated parties, wherein said third designated party is designated to receive emergency communications from members of said first community, to respond to said second communication by initiating communication with said third designated party, and to display information to said third designated party, said information characterizing said first distressed user; and to display, to said third designated party, information characterizing said second distressed user, and a communication system for enabling communication between said third designated party and said first and second mobile devices.

30. The apparatus of claim 29, wherein said communication server is further configured to receive a communication initiated by said first distressed user during a security period, and, in response, to send a notification with information characterizing said first distressed user and a location associated with said first distressed user.

31. The system of claim 29, wherein said information characterizing said first distressed user comprises information indicative of a location of said distressed user.

\* \* \* \* \*